UNITED STATES PATENT OFFICE.

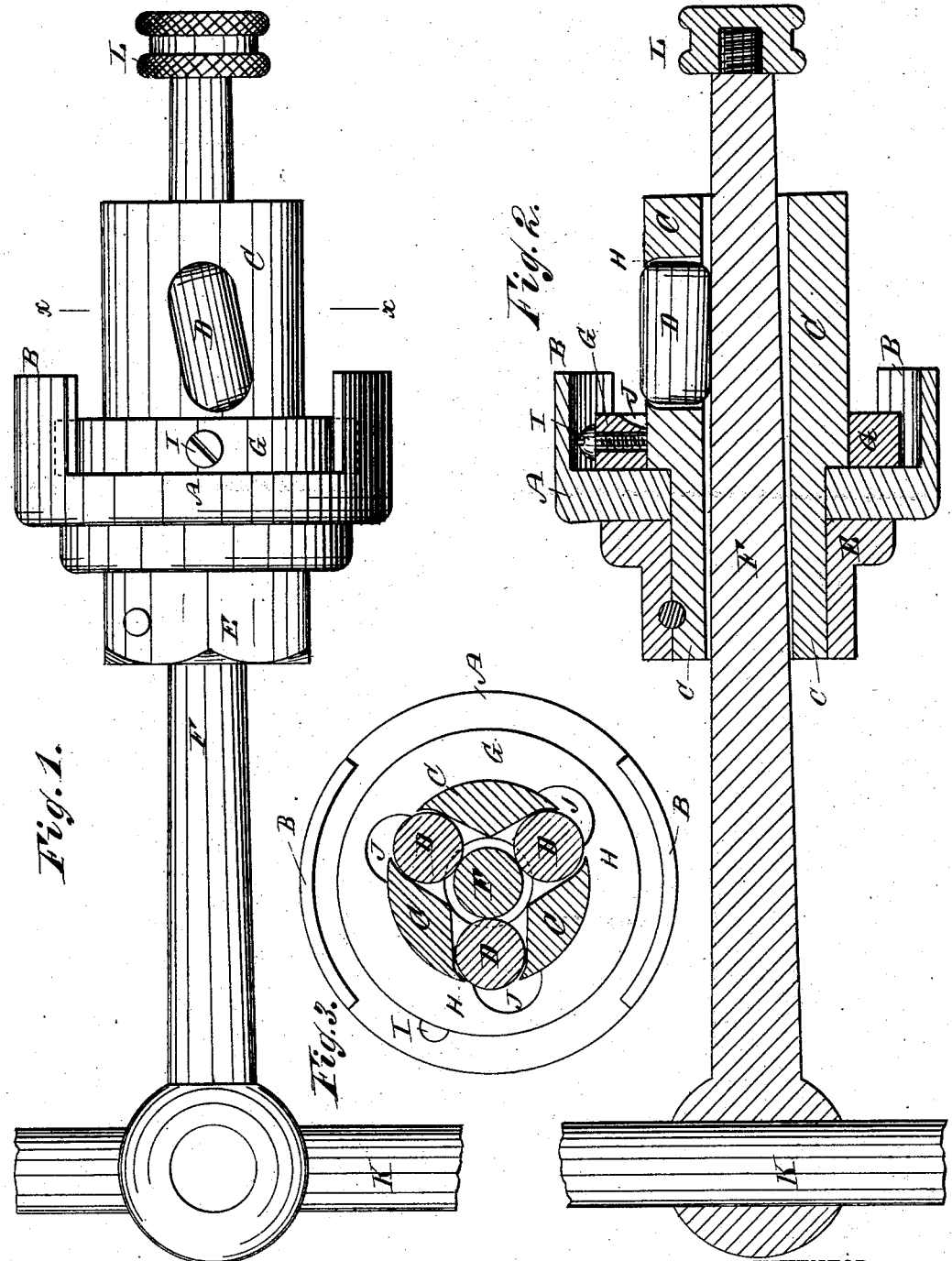

ZACHARIAH J. FERGUSON, OF JACKSON, TENNESSEE.

BOILER-TUBE EXPANDER.

SPECIFICATION forming part of Letters Patent No. 260,555, dated July 4, 1882.

Application filed March 30, 1882. (Model.)

*To all whom it may concern:*

Be it known that I, ZACHARIAH J. FERGUSON, of Jackson, in the county of Madison and State of Tennessee, have invented a new and useful Improvement in Boiler-Tube Expanders, of which the following is a full, clear, and exact description.

This improvement in boiler-tube expanders consists of the rollers set obliquely or spirally in the roller-cage and being cylindrical instead of tapering, and also being arranged without journal-bearings at the ends, whereby they work better than the tapered and spirally-arranged rollers; and it also consists of an adjustable setting device, in combination with the obliquely-arranged rollers, whereby the instrument becomes a tube-setter also to draw the tubes into or through the tube-sheet the proper distance, all as hereinafter more fully described, reference being had to the accompanying drawings, forming part of this specification, in which similar letters of reference indicate corresponding parts in all the figures.

Figure 1 is a side elevation of my improved boiler-tube expander. Fig. 2 is a longitudinal section of the same. Fig. 3 is a transverse section taken on the line $x\ x$ of Fig. 1.

A represents the guard, which rests at its end lips, B, against the tube-sheet, to prevent the expander from entering the tube too far. C is the roller-cage; D, rollers; E, collar to hold guard A in position on the roller-cage. F is the spindle, and G an adjustable collar, which I apply between the bottom of the guard A and the rollers for gaging and setting the boiler-tubes. I make the rollers short and cylindrical, and apply them in the roller-sockets H of the cage without positive end bearings, preferring to have said ends free, whereby they work better, especially in the more oblique arrangement and shorter rollers which I make, the object being not only to draw the spindle into the expander, but also to draw the tube through the tube-sheet; and with this construction for so drawing the spindle and also the tube I apply the adjusting-collar G, to regulate the length that the tube shall be drawn through the tube-sheet, the said collar G being fitted so as to shift along on cage C, between the bottom of the guard A and the rollers, and provided with a set-screw, I, to secure it when desired. The collar is notched in the angle at J coincident with the rollers, so as to be set forward along them in case the tubes are not to be drawn out of the tube-sheet much beyond the ends B of the guard.

In using this instrument the guard A is placed against the tube-sheet and the rollers within the tube, in which they are expanded and rotated by revolving the spindle F, so as to draw the tubes by their spiral pitch against the collar G, whereby irregularity of the projecting ends of the tubes is corrected, and by so drawing the tubes forward the rollers make more turns in the tubes, thereby allowing them more action for expanding the tubes, thus rendering the instrument much less liable to burst the tubes than others. The cylindrical form of the rollers, together with the oblique arrangement, also enables the instrument to expand the tubes more than can be done with any other arrangement without bursting the tubes.

The increased pitch of my arrangement of rollers makes the instrument more expeditious, and after the work is finished the withdrawal of the tool is more quickly effected by the reverse rotation of the spindle. It escapes by fewer turns than are required to cause it to enter in proportion to the distance the tube is drawn by the rollers.

K represents the lever for turning the spindle, and L a check-nut to prevent the spindle from slipping out of the roller-cage.

Having thus fully described my invention, I claim as new and desire to secure by Letters Patent—

1. The combination, with rollers in apertures of the cage and bearing on the spindle, of an adjustable collar, G, having the cavities J, as and for the purpose specified.

2. The combination of spirally-pitched cylindrical rollers D and the adjustable tube-gage G with the roller-cage C, spindle F, and the guard A, substantially as specified.

3. The adjustable tube-gage G, in combination with the spirally-pitched rollers D, roller-cage C, spindle F, and guard A, the gage having cavities J coincident with the rollers, substantially as specified.

ZACHARIAH J. FERGUSON.

Witnesses:
JNO. H. CREEMAN,
M. JULIEN.